United States Patent [19]

Nakanishi et al.

[11] 4,226,018
[45] Oct. 7, 1980

[54] METHOD FOR MANUFACTURING A FLOATING TYPE THIN FILM MAGNETIC HEAD

[75] Inventors: Takuji Nakanishi; Tomoyuki Toshima; Keiichi Yanagisawa, all of Tokyo, Japan

[73] Assignee: Nippon Telegraph and Telephone Public Corporation, Tokyo, Japan

[21] Appl. No.: 14,718

[22] Filed: Feb. 23, 1979

[30] Foreign Application Priority Data

Feb. 27, 1978 [JP] Japan .................................. 53-20901

[51] Int. Cl.³ ............................................. G11B 5/42
[52] U.S. Cl. .............................. 29/603; 204/192 EC; 219/121 EB
[58] Field of Search ...... 29/603; 219/121 P, 121 EM, 219/121 EB; 204/192 E, 192 EC

[56] References Cited

U.S. PATENT DOCUMENTS 4,045,864  9/1977  Morokuma et al. .................. 29/603

*Primary Examiner*—Carl E. Hall
*Attorney, Agent, or Firm*—Frishauf, Holtz, Goodman & Woodward

[57] ABSTRACT

An improved method for manufacturing a floating type thin film magnetic head, which comprises the steps of depositing numerous thin film transducers in a matrix form on a lapped plain surface of core block stock; cutting the core block stock into a plural number of narrow parallelepiped core blocks each containing a row of deposited thin film transducers; placing a thin patterned mask on the lapped recording medium-facing plane surface of each slender core block; ion-etching the tape-facing plane of each narrow core block by irradiating accelerated ions of argon gas through the patterned mask to provide an air-bearing surfaces for the respective magnetic heads; and cutting up the respective processed narrow core blocks into individual magnetic heads.

12 Claims, 6 Drawing Figures

METHOD FOR MANUFACTURING A FLOATING TYPE THIN FILM MAGNETIC HEAD

BACKGROUND OF THE INVENTION

This invention relates to a method for manufacturing floating type thin film magnetic heads, and more particularly to a method for manufacturing such magnetic heads which characteristically comprises the steps of ion-etching the recording medium-facing plane surface of the respective narrow parallelepiped core blocks cut out of a core block stock made of a ferrite or ceramic to provide an air bearing surface with high precision for a plurality of magnetic heads which are later cut off of said core blocks.

Hitherto, the floating type thin film magnetic head has been manufactured from a plurality of narrow parallelepiped core blocks cut out of a core block stock made of a ferrite or ceramic by machining the recording medium-facing plane of the head. In this case, the machining of the recording medium-facing slider surfaces, especially the air-bearing portions of said slider surfaces, has been subject to a considerable limitation with respect to the width of said air-bearing portions, depending on the height to which the head is to be floated. In other words, the above-mentioned machining has been carried out under the extremely rigid restriction which should not be exceeded in any case. The thin film transducer is typically formed of two electrodes, a magnetic material such as permalloy and two conductors as shown in FIG. 2 of enlarged scale. Generally, only a very small margin is allowed for a space between the air bearing surface and the transducer, presenting considerable difficulties in the above-mentioned machining.

U.S. Pat. No. 4,045,864 for a magnetic head-manufacturing method discloses a process of providing a read-write gap. According to this method, that portion of a core block which corresponds to the width of said gap is etched off, and then the gap is finally defined by glass-bonding the said etched portion. The gap is made so as to have a width corresponding to the extent of said etching. The etching is carried out by an ion beam process or plasma process.

SUMMARY OF THE INVENTION

A process of applying ion etching in producing the air-bearing surface of a floating type thin film magnetic head is not known to date. According to this invention, said etching is carried out with higher precision than ever by covering a ferrite core material with a masking material, causing the ferrite core material to be etched at a larger etching rate than that of the masking material, and controlling scattering of the etching rate of the masking material by fixing the content of residual moisture in a sputtering apparatus.

The method of this invention comprises the steps of depositing as usual a large number of thin film transducers by sputtering or evaporation in a matrix form on a lapped plain surface of a core block stock made of a ferrite or ceramic; cutting up the core block stock into a plurality of narrow parallelepiped core blocks, each containing a row of thin film transducers deposited thereon; lapping the recording medium-facing lateral plane of the narrow parallelepiped core block which rectangularly intersects the lapped plane of said core block containing therein a row of thin film transducers to provide a sliding surface for linearly arranged heads; covering the lapped sliding surface of the narrow parallelepiped core block with a thin film patterned mask; etching the lateral lapped plane of the narrow parallelepiped core block by irradiating accelerated ions of argon gas through the patterned mask to provide plural sets of pair of air-bearing surfaces of the heads, each having a prescribed width for the individual linearly arranged heads; removing the patterned mask from the narrow parallelepiped core block by a corrosive liquid after the formation of air-bearing surfaces of the heads; and cutting up the processed core block into individual magnetic heads.

DETAILED DESCRIPTION OF THE INVENTION

Figure 1:
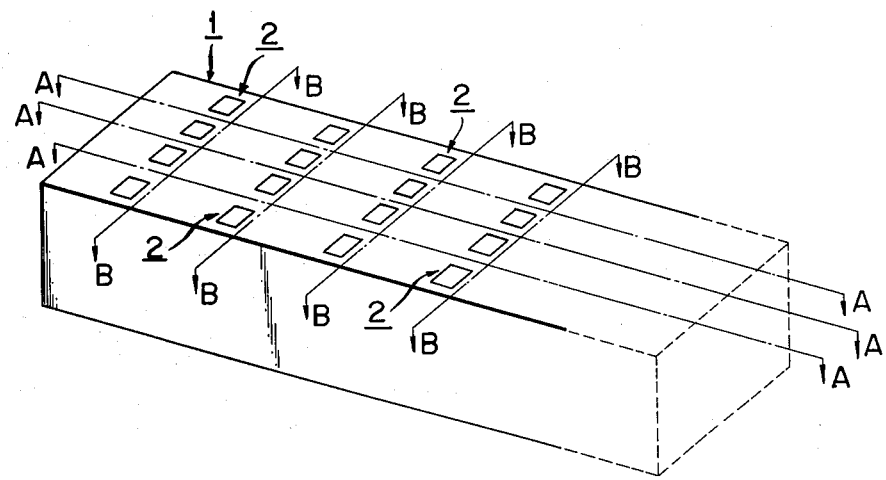
FIG. 1 is an oblique view illustrating a prior art process of manufacturing a floating type thin film magnetic head.
Figure 2:
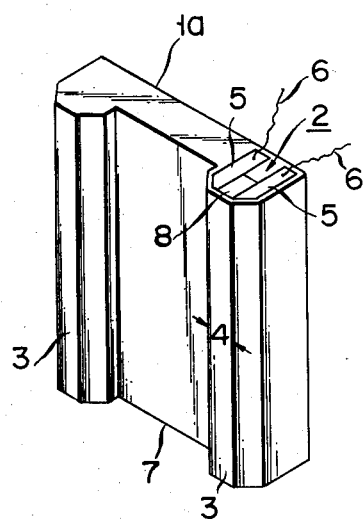
FIG. 2 is an enlarged oblique view of a single floating type thin film magnetic head.

Description is first given by reference to FIG. 1 of one of the prior art processes of manufacturing a floating type thin film magnetic head. A large number of thin film transducers 2 are deposited by sputtering, evaporation, or both in a matrix form on the lapped plain surface of a core block stock 1 made of a ferrite material or ceramic. Thereafter, the core block stock 1 is divided into a plurality of core blocks each containing a thin film transducer 2 deposited thereon by cutting said stock in the longitudinal direction indicated by planes A—A and also in the crosswise direction indicated by planes B—B. Last, the cut core block 1a (shown in FIG. 2) is machined to provide a pair of air-bearing surfaces 3, thereby producing a unit floating type thin film magnetic head as illustrated in FIG. 2. A broad and shallow groove 7 is formed between the paired air-bearing surfaces 3. It is known that the width 4 of the air-bearing surface 3 cannot be increased over the level which is defined from the flying height necessitated to the head.

The typical floating type thin film magnetic head shown in FIG. 2 includes a thin film transducer 2 deposited thereon by sputtering, evaporation or both as mentioned afore. This transducer 2 consists of a pair of electrodes 5 having a prescribed size, a thin magnetic film 8 made of, for example, permalloy and set between the paired electrodes 5, and a pair of conductors 6 connected thereto. It is known that the electrode 5 should have a certain specified area.

Figure 3:
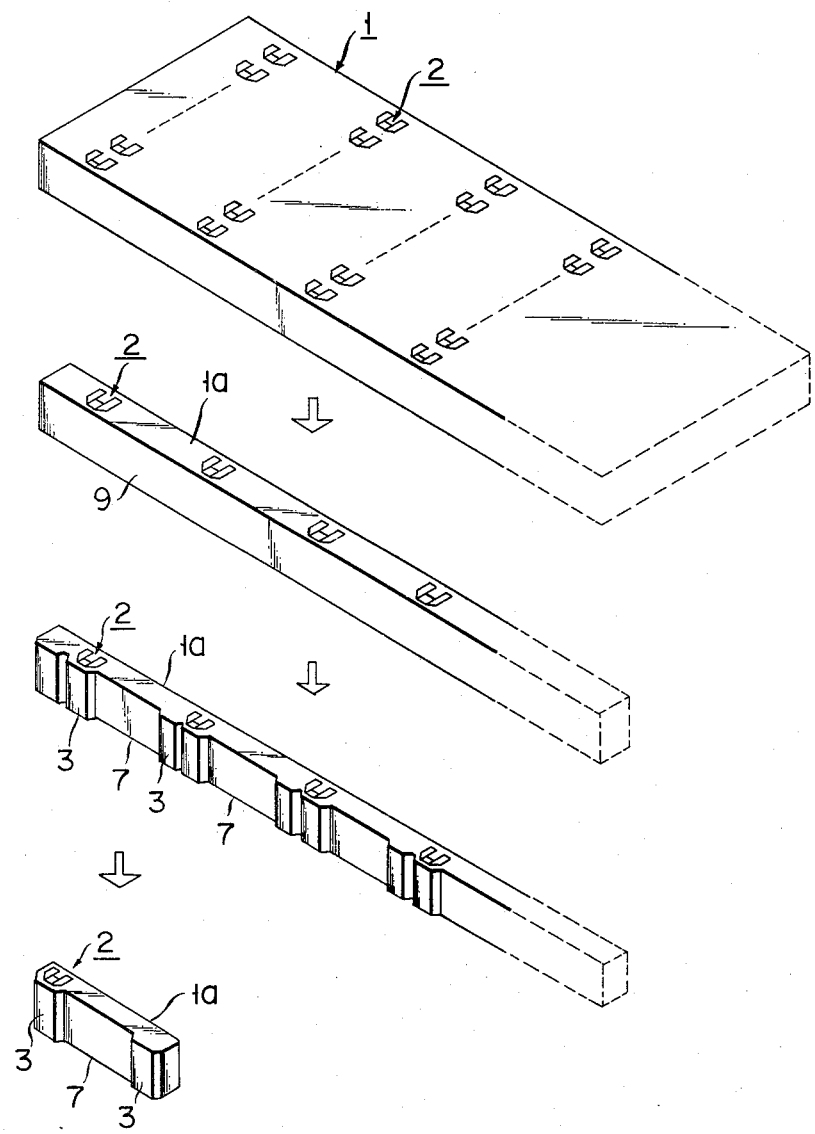
FIG. 3 gives oblique views of products corresponding to the sequential steps of manufacturing a magnetic head according to the method of this invention.

There will be described by reference to FIG. 3 the sequential steps of manufacturing a floating type thin film magnetic head according to the method of this invention.

A large number of thin film transducers 2 constructed as shown in FIG. 2 are deposited by sputtering or evaporation in a matrix form on a mirror-finished plane of core block stock 1. Thereafter, the core block stock 1 is cut into a plurality of narrow parallelepiped core block 1a each including a row of thin film transducers 2 on the upper surface thereof. Then the recording medium-facing lateral plane 9 of the core block 1a is lapped, and covered with a patterned mask (not shown in FIG. 3) in order to form air-bearing surfaces 3 by ion-etching on the lapped lateral plane of the core block 1a. The masked core block 1a is placed in that portion of a sputtering apparatus so as to face a target included therein. Accelerated ions of argon gas are irradiated on the patterned mask, thereby forming air-bearing surfaces of heads on the core block 1a, followed by removing the mask from the core block 1a by a corrosive liquid. Finally, the processed core block 1a is cut up into individual magnetic heads.

A ferrite or ceramic is used as the material for core block stock 1. When a ferrite material is used, the formation of thin film transducer becomes simple, because the ferrite material itself can be used as a part of a magnetic pass. When a ceramic material is used, a broader range, in which the hardness of the core block stock can be selected, than the case of using ferrite material is allowed. As the ferrite material, Ni-Zn ferrite, Mn-Zn ferrite or others can be used.

The metal mask (not shown in FIG. 3) used to provide air-bearing surfaces 3 on the lapped lateral plane 9 is made of a thin metal film of chromium, titanium or aluminum. It is possible to apply these metal masks in a single layer or in a laminate form consisting of different kinds of metal film. Ion-etching may be carried out by a sputtering apparatus or ion beam-irradiating apparatus. Accelerated ions of argon gas are irradiated through the patterns of the etching mask to provide air-bearing surfaces 3. The patterns of the etching mask may be formed by a known photolithographic technique.

In orger to obtain a great etching depth, it is advised to carry out said etching through a thick mask, or to enlarge the value of ratio of etching rate S of the core block vs. the etching rate Sm of the mask. When a thick mask is used, however, it is necessary to take a long time for preparation of said patterned thick mask. Moreover, it becomes difficult to obtain ion-etched patterns of high precision by the phenomenon of side etching, when the thick mask is used. In consideration of this fact, the mask of high S/Sm value is used for the method of this invention in order to obtain a great and precise etching depth.

As used with the method of this invention, the etching mask consists of a thin film of chromium, titanium or aluminum. A solution of ammonium cerium sulfate is used as the etchant for chromium, a solution of nitric-fluoric acid is used as the etchant for titanium, and a solution of phosphoric acid is applied as the etchant for aluminum.

In order to form a thick mask having a posibility of producing large etching depth, it is advised to prepare the mask from a laminate of two or more different metal films. For instance, when a thin film pattern mask of chromium or titanium having a thickness of 2 microns was used in order to obtain more than 10 microns depth of the grooves in the core block for the purpose of ensuring reasonable floating height of head, it was found that the side etching appeared thereabout was not negligible. In contrast, when a laminated mask consisting of a titanium film and chromium film each having a thickness of 1 micron, was used precise grooves having a depth of more than 10 microns could be obtained in the core block, because that one of said laminated metal films was not etched while the other was etched.

Our studies have disclosed that, during the ion-etching carried out according to the method of this invention, adsorption of hydroxyl groups —OH to a metal mask provides a dispersion of etching rate of the metal mask. Generally, the residual moisture in the bell-jar of a sputtering apparatus is supposed to lead to the growth of the above-mentioned hydroxyl groups. Even when the sputtering apparatus is evacuated to the extent of $1 \times 10^{-6}$ Torr, moisture still remains therein. When ion-etching is continued for long period of time under such condition, the content of said residual moisture decreases by the adsorption of hydroxyl groups to the metal mask. At a certain point of time, therefore, the ion-etching rate changes rapidly, failing to cause the aforesaid ratio of S/Sm to have a large value. Particularly, when the groove is to be formed to a depth larger than 5 microns, adsorption of the hydroxyl groups exerts a prominent effect.

If the grooves are etched to a depth larger than 5 microns, the content of residual moisture in the bell-jar of a sputtering apparatus should be kept substantially constant by placing in the bell-jar a material to which moisture has been tightly adsorbed or a material containing water of crystallization. As a moisture-holding material to be placed in the bell-jar, silica gel sufficiently soaked with moisture in an atmosphere having a relative humidity of 50%, potash alum $KAl(SO_4)_2.12H_2O$, or barium hydroxide $Ba(OH)_2.8H_2O$ is preferred.

A patterned mask used to the method of this invention may be prepared from not only the previously mentioned chromium, titanium or aluminum, but also $Al_2O_3$, $CR_2O_3$ or $TiO_2$.

The ion-etching is carried out by an ordinary sputtering apparatus. A ferrite core block is mounted on a sample support made of silicon oxide or aluminum oxide and set in the sputtering apparatus. The bell-jar of the sputtering apparatus is evacuated at about $1 \times 10^{-6}$ Torr. Thereafter, argon gas containing hydrogen gas having a partial pressure of $1 \times 10^{-3}$ to $2 \times 10^{-3}$ Torr is conducted into the bell-jar. Ion-etching is carried out by supplying radio frequency electric power of, for example, 13.56 MHz to the sputtering apparatus.

As mentioned above, when the mask is prepared from a thin film of chromium or aluminum, hydroxyl groups supposedly resulting from the residual moisture remaining in the bell-jar is ready to be combined with the mask material, and the etching rate of the mask material is assumed to decrease.

Figure 4:
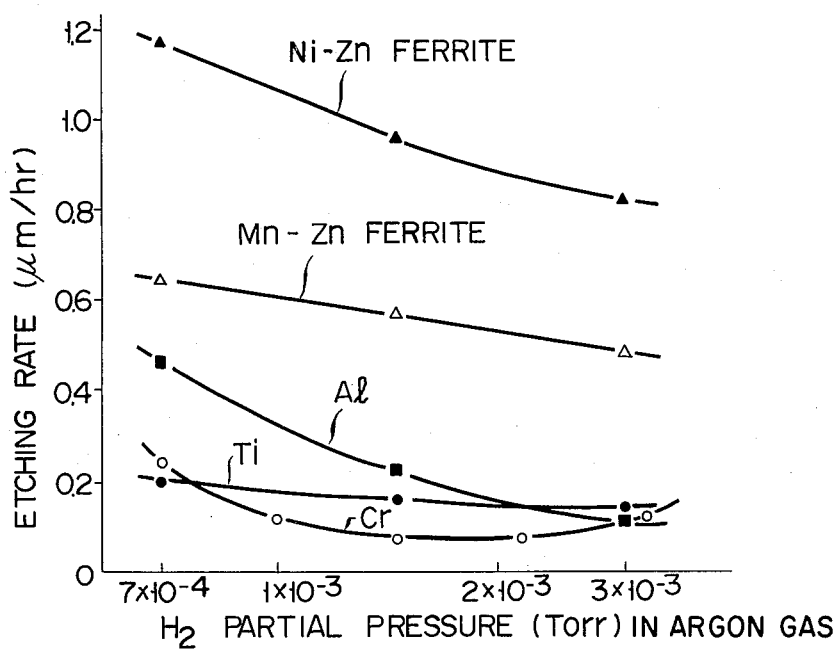
FIG. 4 is a curve diagram showing the effect of partial pressure of hydrogen on the etching rate at which a ferrite material and mask material are etched according to the method of this invention.

FIG. 4 shows the relationship between the partial pressure of hydrogen in the argon gas and the etching rate of chromium, titanium and aluminum as a mask material and Ni-Zn ferrite and Mn-Zn ferrite as a core block material. Data of FIG. 4 were obtained by performing experiments with the radio frequency power density chosen to be 1.3 watt/cm$^2$, using a sample support made of silicon oxide plate. the etching time was 2 hours. FIG. 4 shows that, except for a mask of titanium, the other materials were etched at a rate varying with the partial pressure of hydrogen gas in the argon gas. It can be also seen from FIG. 4 that the value of the etching rate ratio of Ni-Zn ferrite vs. chromium is more than 10.

There will be described comparison made between the case where ion-etching was carried out with moistened silica gel placed in the bell-jar and the case where the ion-etching was conducted without said moistened silica gel.

Figure 5:
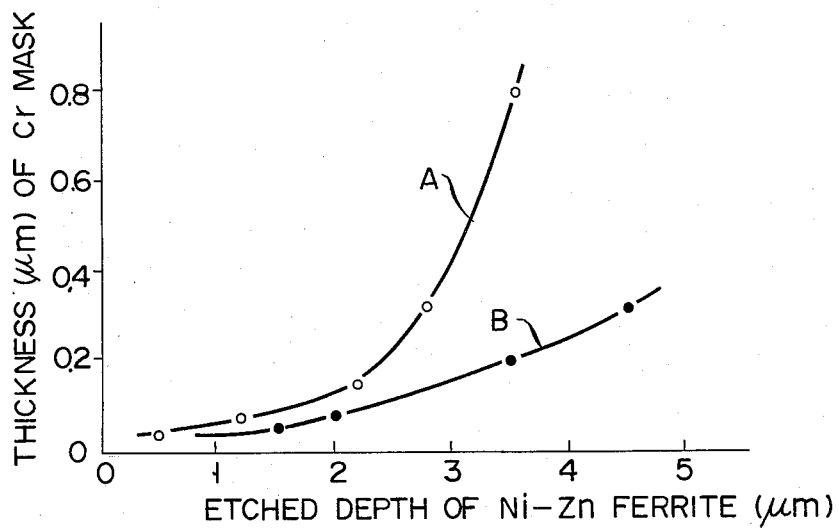
FIG. 5 is a curve diagram showing the relation between the thickness of a mask of chromium and the depth to which a Ni-Zn ferrite material is etched by the method of the invention.

About 20 grams of fully moistened silica gel was placed in the bell-jar of a sputtering apparatus. Core blocks of Ni-Zn ferrite masked with a thin chromium film were set on a sample support made of silicon oxide. Argon gas containing hydrogen gas having a partial pressure of $2 \times 10^{-3}$ Torr was taken into the bell-jar, followed by ion-etching. On the other hand, ion-etching was undertaken without moistened silica gel under the same condition as described above. In these cases, each of the core blocks was masked with the mask having different thickness. The fully etched depths of core blocks are plotted on the abscissa of FIG. 5, and the thickness of the masks are plotted on the ordinate of FIG. 5. The curve A of FIG. 5 represents the case where the moistened silica gel was not used, and the curve B shows the case where the moistened silica gel was applied. As apparent from FIG. 5, a substantially constant amount of moisture was spread through the bell-jar, when fully moistened silica gel was placed in the bell-jar, enabling the core block to be etched at a noticeably constant rate.

Figure 6:
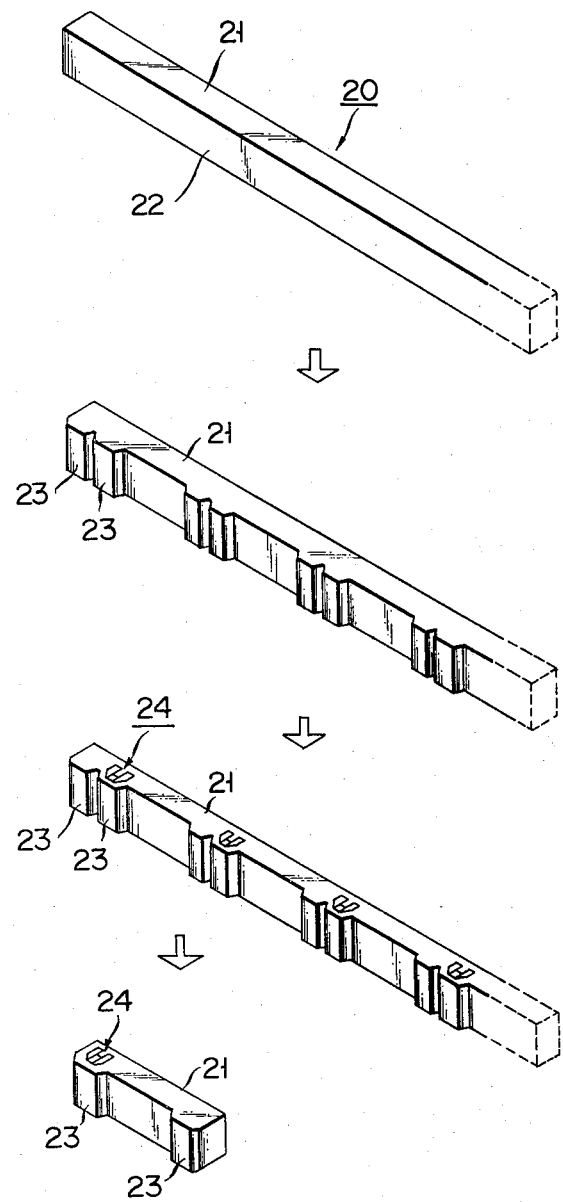
FIG. 6 shows oblique views of products corresponding to the sequential steps of manufacturing a magnetic head according to another embodiment of the method of this invention.

There will be described by reference to FIG. 6 a modified method of this invention.

At first, lapping is made of two longitudinal plane surfaces 21 and 22 of a narrow parallelepiped core block 20, which interset each other at right angle. Thereafter, the lapped plane surface 22 is covered with a patterned mask (not shown in FIG. 6), followed by ion-etching the core block 20 through the patterned mask by means of back sputtering or ion-beam irradiation, to provide air-bearing surfaces 23 for the respective heads constituting said core block 20. Then a plurality of thin film transducers 24 are deposited on the other lapped plane surface 21 by means of evaporation or sputtering at points corresponding to the air-bearing surfaces 23. After removing the mask from the core block 21 by a corrosive liquid, the core block 21 is cut up into individual magnetic heads.

This invention will be more fully understood from the following Example.

EXAMPLE

An example of this invention will be described below by reference to FIG. 3.

A large number of thin film transducers 2 were deposited on a mirror-finished smooth plane surface of a core block stock 1 by evaporation or sputtering. That is to say, electrodes were deposited by sputtering copper on said plane surface by an ordinary photolithographic technique, and further thin film magnetic materials were formed by sputtering a permalloy. Then, the core block stock 1 was divided into a plurality of narrow parallelepiped core blocks 1a, each including a row of thin film transducers.

The sliding surface 9 of the thus processed core block 1a was lapped, and sputtered with a mask material consisting of laminated two thin film layers of aluminum and chromium, each layer having a thickness of about 1 micron. Photoresists having a prescribed pattern were formed on the surface of the laminated film by means of a photolithographic technique. These photoresists were etched by an etchant consisting of phosphoric acid. In this time, the aluminum film did not substantially generate side etching, and the chromium film was not etched at all. Thereafter, the thin chromium film was etched, using an etchant consisting of ammonium cerium sulfate, and utilizing the pattern of etched thin aluminum film.

When the order was reversed in which the chromium and aluminum films were etched, the same result was obtained.

The core block 1a thus processed was mounted on a sample support made of silicon oxide, and received in a bell-jar of a sputtering apparatus. A fully moistened silica gel was placed in the bell-jar, and argon gas containing hydrogen gas having a partial pressure of $1.6 \times 10^{-3}$ Torr was taken into the bell-jar. Thereafter, radio frequency electric power of 1.3 watt/cm$^2$ was applied to the sputtering apparatus. Ion-etching was continued for 10 hours.

Upon completion of the ion-etching, the mask material was removed from the core block 1a by a corrosive liquid. After thoroughly washed and dried, the processed core block 1a was cut up into individual magnetic heads.

The dimensional precision with which the individual head was finished fell within the range of ±0.5 micron with respect to the width of the air-bearing surface and the relative position of the air-bearing surface and the thin film transducer. The finished heads were produced with a yield of 90% or over. In contrast, heads finished by the prior art machining process had a dimensional precision of ±10 microns and a yield of about 50%.

We claim:

1. A method for manufacturing a floating type thin film magnetic head which comprises the steps of:
   (a) depositing a large number of thin film transducers in a matrix form on a lapped plain surface of a core block stock;
   (b) cutting up the core block stock into a plurality of narrow parallelepiped core blocks each including a row of thin film transducers;
   (c) lapping the recording medium-facing lateral plane of the narrow parallelepiped core blocks so as to prepare a slider surface of connected heads;
   (d) covering the lapped recording medium-facing lateral plane of the core block with a thin film patterned mask;
   (e) ion-etching the lapped recording medium-facing lateral plane of the core block by irradiating accelerated ions of argon gas through the patterned mask to provide air-bearing surfaces each having a prescribed width, the ion-etching step comprising placing the core block in a bell-jar of a sputtering apparatus, introducing argon gas thereinto which contains hydrogen gas having a partial pressure of about $1.6 \times 10^{-3}$ Torr, placing a moisture holding material in the bell-jar to substantially fix the content of residual moisture in the bell-jar, and supplying radio frequency electric power to the sputtering apparatus;
   (f) removing the patterned mask from the core block by a corrosive liquid; and
   (g) cutting up the processed core block into individual magnetic heads.

2. The method according to claim 1, wherein said moisture holding material is at least one material selected from the group consisting of moistened silica gel, moistened potash alum and moistened barium hydroxide.

3. The method according to claim 1, wherein the thin film patterned mask used in step (d) is made of a material selected from the group consisting of chromium, titanium, aluminum, chromium oxide, titanium oxide and aluminum oxide.

4. The method according to claim 1, wherein the core block stock used in step (a) is made of a material selected from the group consisting of Ni-Zn ferrite and Mn-Zn ferrite.

5. The method according to claim 1, wherein the thin film patterned mask is prepared from a laminate of two or more different thin films selected from the group consisting of chromium, titanium and aluminum.

6. A method for manufacturing a floating type thin film magnetic head which comprises the steps of:
  (a) lapping two longitudinal perpendicularly intersecting planes of a parallelepiped core block cut out of a core block stock;
  (b) covering one side plane of the core block with a patterned mask;
  (c) ion-etching the masked plane of the core block through the patterned mask to provide pairs of air-bearing surfaces each having a prescribed width, the ion-etching step comprising placing the core block in a bell-jar of a sputtering apparatus, introducing argon gas thereinto which contains hydrogen gas having a partial pressure of about $1.6 \times 10^{-3}$ Torr, placing a moisture holding material in the bell-jar to substantially fix the content of residual moisture in the bell-jar, and supplying radio frequency electric power to the sputtering apparatus;
  (d) removing the patterned mask from the core block by a corrosive liquid;
  (e) depositing a plurality of thin film transducers on the other lapped plane surface at points corresponding to the air-bearing surfaces; and
  (f) cutting up the processed core block into individual magnetic heads.

7. The method according to claim 1 or 2 comprising placing about 20 grams of said moisture holding material in the bell-jar to substantially fix the content of residual moisture in the bell-jar.

8. The method according to claim 6, wherein said moisture holding material is at least one material selected from the group consisting of moistened silica gel, moistened potash alum and moistened barium hydroxide.

9. The method according to claim 6 wherein said ion-etching step comprises back sputtering.

10. The method according to claim 6 wherein said ion-etching step comprises ion-beam irradiation.

11. The method according to any one of claims 6, 9 or 10, wherein said step of depositing a plurality of thin film transducers is carried out by means of evaporation.

12. The method according to any one of claims 6, 9 or 10, wherein said step of depositing a plurality of thin film transducers comprises sputtering.

* * * * *